United States Patent
Kim et al.

(10) Patent No.: US 9,826,125 B2
(45) Date of Patent: Nov. 21, 2017

(54) SYSTEM FOR CORRECTING COLOR OF PHOTO PRINTER BY USING USER TERMINAL AND METHOD THEREFOR

(71) Applicant: DS GLOBAL, Seoul (KR)

(72) Inventors: Yu-Min Kim, Bucheon-si (KR); Sam Hee Lee, Seoul (KR)

(73) Assignee: DS GLOBAL, Seoul (KR)

( * ) Notice: Subject to any disclaimer, the term of this patent is extended or adjusted under 35 U.S.C. 154(b) by 0 days.

(21) Appl. No.: 15/128,186

(22) PCT Filed: Mar. 24, 2015

(86) PCT No.: PCT/KR2015/002888
§ 371 (c)(1),
(2) Date: Oct. 5, 2016

(87) PCT Pub. No.: WO2015/147528
PCT Pub. Date: Oct. 1, 2015

(65) Prior Publication Data
US 2017/0104895 A1    Apr. 13, 2017

(30) Foreign Application Priority Data

Mar. 25, 2014   (KR) .................. 10-2014-0034536

(51) Int. Cl.
| | | |
|---|---|---|
| B41J 2/525 | (2006.01) | |
| H04N 1/60 | (2006.01) | |
| H04N 1/00 | (2006.01) | |
| G06K 15/02 | (2006.01) | |

(52) U.S. Cl.
CPC ............ *H04N 1/6097* (2013.01); *B41J 2/525* (2013.01); *G06K 15/021* (2013.01); *G06K 15/028* (2013.01); *G06K 15/1819* (2013.01); *H04N 1/00265* (2013.01); *H04N 1/00973* (2013.01); *G06K 2215/0094* (2013.01); *G06K 2215/0097* (2013.01); *H04N 1/6036* (2013.01)

(58) Field of Classification Search
CPC . B41J 15/00; B41J 15/02; B41J 15/044; B41J 13/0009; B41J 13/00; B41J 13/0027; B41J 2/32; B41J 3/4075
See application file for complete search history.

(56) References Cited

FOREIGN PATENT DOCUMENTS

| | | |
|---|---|---|
| JP | 2011029706 | 2/2011 |
| KR | 20040049522 | 6/2004 |
| KR | 20070086331 | 8/2007 |
| KR | 20130135823 | 12/2013 |

OTHER PUBLICATIONS

International Search Report—PCT/KR2015/002888 dated Jun. 26, 2015.

*Primary Examiner* — Kristal Feggins
(74) *Attorney, Agent, or Firm* — Cantor Colburn LLP

(57) ABSTRACT

A color correction system for a photo printer comprises: a mobile application which accesses a service server, downloads newly updated extension color correction data from the service server, and stores the newly updated extension color correction data; a control unit which compares a version of the extension color correction data with a version of first color correction data stored in the photo printer and performs control so that the extension color correction data stored in the photo printer is updated based on a result of the comparison; and a short-distance communication module which transmits the first extension color correction data to the photo printer while operating in conjunction with the photo printer.

1 Claim, 4 Drawing Sheets

SYSTEM FOR CORRECTING COLOR OF PHOTO PRINTER BY USING USER TERMINAL AND METHOD THEREFOR

TECHNICAL FIELD

The present invention relates to color correction for a photo printer and, more particularly, to a color correction system and method for a photo printer, wherein if new color correction data registered with a service server is present after a smart sheet is fabricated, color correction data printed on the smart sheet can be replaced with extension color correction data using the color correction data as an index, a color can be corrected based on the extension color correction data, and printing can be performed.

BACKGROUND ART

Performance of a camera mounted on a smart device, such as a smart phone, approaches a common digital camera, and persons who attempt to leave behind memory by taking a photograph using a smart device that is easy to carry rather than a digital camera are increasing. Accordingly, consumer's needs to take a photograph and to immediately output the taken photograph without a separate conversion task are gradually increasing.

As if such consumer's needs are incorporated, there has been released a photo printer product by which a photograph in a smart phone can be printed anywhere and at any time.

Print paper adopting a zero ink method is applied to such a photo printer, and thus a maintenance cost is small because ink or a cartridge is not additionally required. In this case, the zero ink method refers to a method for representing a color image using heat only because a portion corresponding to a cartridge is included in paper.

There is a difference in the color represented on print paper now on the market because the paper has a different characteristic depending on paper (the dimension of fabricated paper) used. Accordingly, a smart sheet for correcting such a difference of color is used. That is, the smart sheet includes barcode data having information about color correction into which the characteristics of paper to be printed have been incorporated, and thus functions to correct a color variation between pieces of print paper using such barcode data.

However, since a difference between the characteristics of initially fabricated print paper and the characteristics of recently fabricated print paper is great, there is a problem in that a required color cannot be represent and thus a color variation problem between printers has emerged.

In order to supplement such a problem, there was proposed extension color correction data by extending a color correction factor of 53 bits, included in existing color correction data, to 144 bits by adding parameters to existing color correction data because it is determined that the color correction factor is not sufficient to correct a color.

Accordingly, in order to index color correction data in an existing smart sheet and apply extension color correction data to color correction, there was a need for a function for generating an extension color correction data region within a printer, storing the generated extension color correction data region, and reconfiguring environment configuration information based on color correction data using extension color correction data.

Such extension color correction data is newly generated whenever new print paper is produced. Users have to be updated on such information before the print paper is marketed.

In particular, the characteristics of the same print paper, for example, a temperature, an exposure time, etc. for implementing a color image may be different because the thickness of coating paints is different depending on the mixture of compounds of production dimensions in a process of fabricating print paper. Accordingly there is a difficulty in implementing an accurate color image if the same information about color correction included in a smart sheet is used.

DISCLOSURE

Technical Problem

The present invention has been made to solve the conventional problems, and an object of the present invention is to provide a color correction system and method for a photo printer, wherein if new color correction data registered with a service server is present after a smart sheet is fabricated, color correction data printed on the smart sheet can be replaced with extension color correction data using the color correction data as an index, a color can be corrected based on the extension color correction data, and printing can be performed.

Technical Solution

To achieve the above object, a color correction system for a photo printer according to an aspect of the present invention includes a mobile application which accesses a service server, downloads newly updated extension color correction data from the service server, and stores the newly updated extension color correction data; a control unit which compares a version of the extension color correction data with a version of first color correction data stored in the photo printer and performs control so that the extension color correction data stored in the photo printer is updated based on a result of the comparison; and a short-distance communication module which transmits the first extension color correction data to the photo printer while operating in conjunction with the photo printer.

Furthermore, the extension color correction data preferably is data for correcting a color using color correction data included in a smart sheet mounted on the photo printer as an index.

Furthermore, the color correction data preferably includes required energy for printing a required color at a head temperature of the photo printer and the sensitivity of media for the head temperature.

Furthermore, the extension color correction data preferably includes required energy for printing a required color at a head temperature of the photo printer, the sensitivity of media for the head temperature, and a constant for reducing print energy of a next color.

Furthermore, the control unit preferably checks whether the extension color correction data previously registered with the service server is present through a mobile application and downloads the extension color correction data if, as a result of the check, the previously registered extension color correction data is found to be present.

Furthermore, the control unit preferably compares the version of the received extension color correction data with the version of the first color correction data stored in the photo printer and performs control so that the first extension color correction data is updated with the extension color correction data if the version of the first color correction data is earlier than the version of the extension color correction data based on a result of the comparison.

A color correction method for a photo printer according to the present invention includes the steps of 1) executing, by a user terminal, a mobile application and accessing a service server; 2) downloading newly updated extension color data if the newly updated extension color data is present in the service server and storing the downloaded extension color data in the mobile application; 3) checking a version of first color correction data stored in a photo printer by associating the user terminal and the photo printer; and 4) transmitting, by the mobile application, the extension color correction data to the photo printer if the version of the first color correction data is different from the extension color correction data so that the first color correction data is updated.

Furthermore, the color correction method preferably further includes the steps of 5) checking, by the photo printer, recognizing second color correction data printed on a smart sheet; 6) substituting the extension color correction data for the second color correction data using the second color correction data as an index if the second color correction data is not the extension color correction data; and 7) correcting, by the photo printer, a color based on the extension color correction data and printing an image on print paper.

Furthermore, the first or second color correction data preferably includes required energy for printing a required color at a head temperature of the photo printer and the sensitivity of media for the head temperature.

Furthermore, the extension color correction data preferably includes required energy for printing a required color at a head temperature of the photo printer, the sensitivity of media for the head temperature, and a constant for reducing print energy of a next color.

Advantageous Effects

Accordingly, the present invention has an advantage in that accurate color correction data can be maintained by downloading new color correction data if the new extension color correction data registered with a service server is present, checking the version of color correction data stored in a photo printer, and updating the color correction data stored in the photo printer with the downloaded extension color correction data based on a result of the check.

Furthermore, the present invention has an advantage in that a target color image can be accurately represented because accurate color correction data can be maintained in a photo printer by updating color correction data stored in a photo printer with new color correction data downloaded from a server.

Furthermore, the present invention has an advantage in that user convenience can be improved because accurate color correction data within a photo printer is automatically updated by updating color correction data stored in the photo printer with new color correction data downloaded from a server.

In particular, there is an advantage in that if new color correction data registered with a service server is present after a smart sheet is fabricated, a color can be corrected based on extension color correction data by substituting the extension color correction data for color correction data printed on the smart sheet using the color correction data as an index.

BEST MODE

Figure 1:
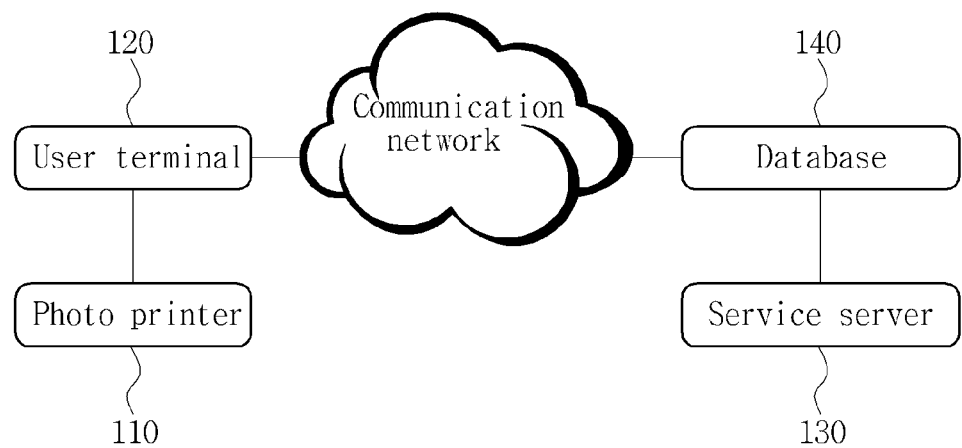
FIG. 1 is a diagram showing a system for correcting a color of a photo printer according to an embodiment of the present invention.

Hereinafter, a system and method for correcting a color of a photo printer using a user terminal according to an embodiment of the present invention is described in detail with reference to the accompanying drawings. Parts required for the understanding of an operation and action according to the present invention are chiefly described in detail.

Furthermore, in describing the elements of the present invention, different reference numerals may be assigned to elements having the same name depending on the drawings, and the same reference numeral may be assigned to elements in different drawings. In such a case, however, it does not mean that a corresponding element has a different function depending on an embodiment and has the same function in different embodiments. The function of each element should be determined based on a description of each element in a corresponding embodiment.

In particular, the present invention proposes a new method of activating a mobile application, downloading new color correction data using the activated mobile application if the new color correction data registered with a service server is present, checking the version of color correction data stored in a photo printer, and updating the color correction data stored in the photo printer with the downloaded color correction data based on a result of the check.

FIG. 1 is a diagram showing a system for correcting a color of a photo printer according to an embodiment of the present invention.

As shown in FIG. 1, the system for correcting a color of a photo printer according to the present invention may be configured to include a photo printer 110, a user terminal 120, a service server 130, and a database 140.

The photo printer 110 may read barcode data (second color correction data) from a smart sheet mounted thereon and apply extension color correction data using the read barcode data as an index.

The photo printer 110 may obtain color correction data for correcting a color from barcode (second color correction data) included in a smart sheet, and may reconfigure environment configuration information based on extension color correction data previously stored in internal memory thereof using the obtained color correction data as an index. In this case, the environment configuration information is a parameter for representing a target color on print paper, and may include a temperature, an exposure time, etc. for example.

In this case, the photo printer 110 is periodically or non-periodically updated with a new version of extension color correction data in accordance with a version of the extension color correction data stored in the internal memory.

The user terminal 120 may activate a mobile application, may check whether a new version of extension color correction data registered with a service server is present, and may download the new version of extension color correction data using the activated mobile application if, as a result of the check, the new version of extension color correction data is found to be present.

In this case, the user terminal 120 may access the service server using wireless communication and periodically or non-periodically check whether the new extension color correction data registered with the accessed service server is present.

The user terminal 120 may check a version of first color correction data previously stored in the photo printer 110 while operating in conjunction with the photo printer 110 using short-distance wireless communications.

In this case, the extension color correction data refers to color correction data extended to 144 bits by adding a plurality of parameters to the second color correction data of 53 bits included in an existing smart sheet.

The range in which a color can be corrected is increased by such an extension of color correction data. That is, the photo printer according to the present invention uses thermal sensitive printing paper that represents a color using heat or energy, and adjusts a color image represented on print paper by controlling energy.

In this case, the energy may be represented as in Equation 1 below.

$$E_{cyan} = G_{inv,cyan} + S_{eff,cyan} * (T_s - T_g) + Sx1_{cyan} * E_{magenta} + Sx2_c * E_{yellow}$$

$$E_{magenta} = G_{inv,magenta} + S_{eff,magenta} * (T_s - T_g) + Sx1_{magenta} * E_{yellow} + Sx2_{magenta} * E_{cyan}$$

$$E_{yellow} = G_{inv,yellow} + S_{eff,yellow} * (T_s - T_g) + Sx1_{yellow} * E_{cyan} + Sx2_{yellow} * E_{magenta}$$

[Equation 1]

In Equation 1, E indicates actually applied energy. $G_{inv}$ indicates required energy for printing a required color at a head temperature in a steady state. $S_{eff}$ indicates the sensitivity of a media (the media is changed depending on a temperature of the head and is necessary for uniform print density) for the head temperature. $T_s$ indicates a measured temperature of the head. $T_g$ indicates a specific temperature when the value $G_{inv}$ is corrected. Sx1 and Sx2 are constants for reducing print energy of a next color image, which is previously applied energy, and have a value of 0.1~-1.

From Equation 1, it may be seen that in existing first or second color correction data, there is a limit to the correction of a color because the existing first or second color correction data may be used to control only the values $G_{inv}$ and $S_{eff}$, wherein in extension color correction data, the range in which a color can be corrected has been increased because the parameters Sx1 and Sx2 have been added.

The user terminal 120 may provide the downloaded extension color correction data to the photo printer 110 if the version of first color correction data previously stored in the photo printer 110 is found to be earlier than the version of the extension color correction data downloaded from the service server 130.

The service server 130 may provide the user terminal with the mobile application for managing extension color correction data for representing a color on print paper from the photo printer.

The service server 130 may provide the user terminal with a new version of extension color correction data if a request for the new version of extension color correction data is received from the user terminal.

In this case, the service server 130 may notify the user terminal that the new version of extension color correction data has been registered whenever the new version of extension color correction data is registered.

The database 140 may store the mobile application, the extension color correction data, etc.

Figure 2:
FIG. 2 is a diagram showing an actual shape of a smart sheet used in a photo printer.

FIG. 2 is a diagram showing an actual shape of a smart sheet used in the photo printer.

From FIG. 2, it may be seen that print paper mounted on the photo printer includes barcode data including color correction data for correcting a color represent on the print paper.

The barcode data consists of 53 bits and is read by the photo printer.

Figure 3:
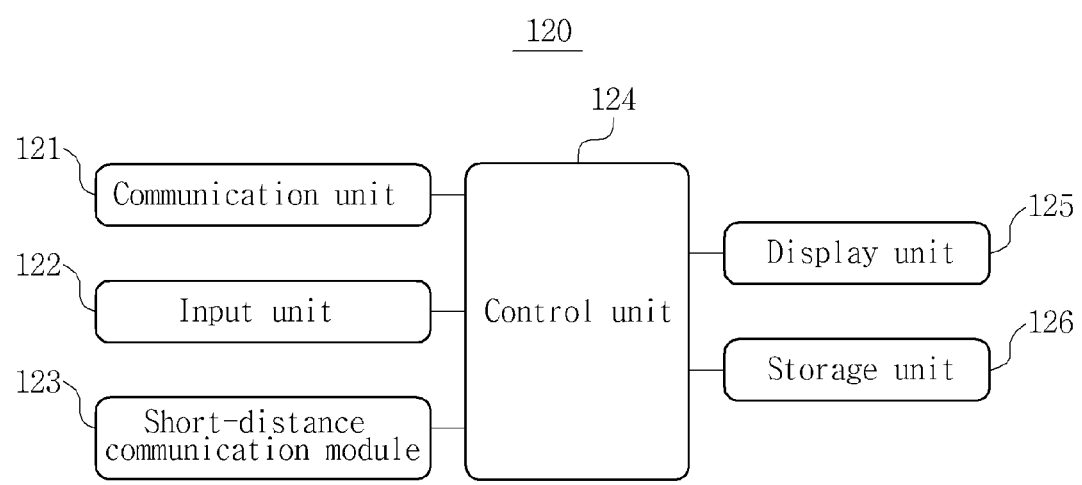
FIG. 3 is a diagram showing a detailed configuration of a user terminal according to an embodiment of the present invention.

FIG. 3 is a diagram showing a detailed configuration of the user terminal according to an embodiment of the present invention.

As shown in FIG. 3, the user terminal 120 according to the present invention may be configured to include a communication unit 121, an input unit 122, a short-distance communication module 123, a control unit 124, a display unit 125, and a storage unit 126.

The communication unit 121 may transmit and receive various data while operating in conjunction with the service server through wireless communication. For example, the communication unit 121 may receive a new version of extension color correction data from the service server while operating in conjunction with the service server using wireless communication.

The input unit 122 may receive information according to a manipulation of a key or menu by a user.

The short-distance communication module 123 may transmit and receive various data while operating in conjunction with the photo printer through short-distance wireless communication. For example, the short-distance communication module 123 may receive version information about previously stored first color correction data from the photo printer while operating in conjunction with the photo printer through short-distance wireless communication, and may transmit a new version of extension color correction data.

In this case, the short-distance wireless communication may be a concept including radio Frequency Identification (RFID), Zigbee, Near Field Communication (NFC), WiFi, Wibro, etc.

The control unit 124 may activate a mobile application in response to a manipulation of a key or menu by a user, may access the service server using the activated mobile application, and may download a new version of extension color correction data previously registered with the accessed service server.

The control unit 124 may access the photo printer using the mobile application, may check a version of first color correction data previously stored in the accessed photo printer, and may send the extension color correction data downloaded from the service server based on a result of the check.

That is, the control unit 124 updates the previous version of the first color correction data previously stored in the photo printer based on the new version of the downloaded extension color correction data.

When the mobile application is activated, the display unit 125 may display information about the transmission of the extension color correction data, update, etc. which are performed through the mobile application.

The storage unit 126 may store the mobile application, the extension color correction data, etc.

MODE FOR INVENTION

Figure 4:
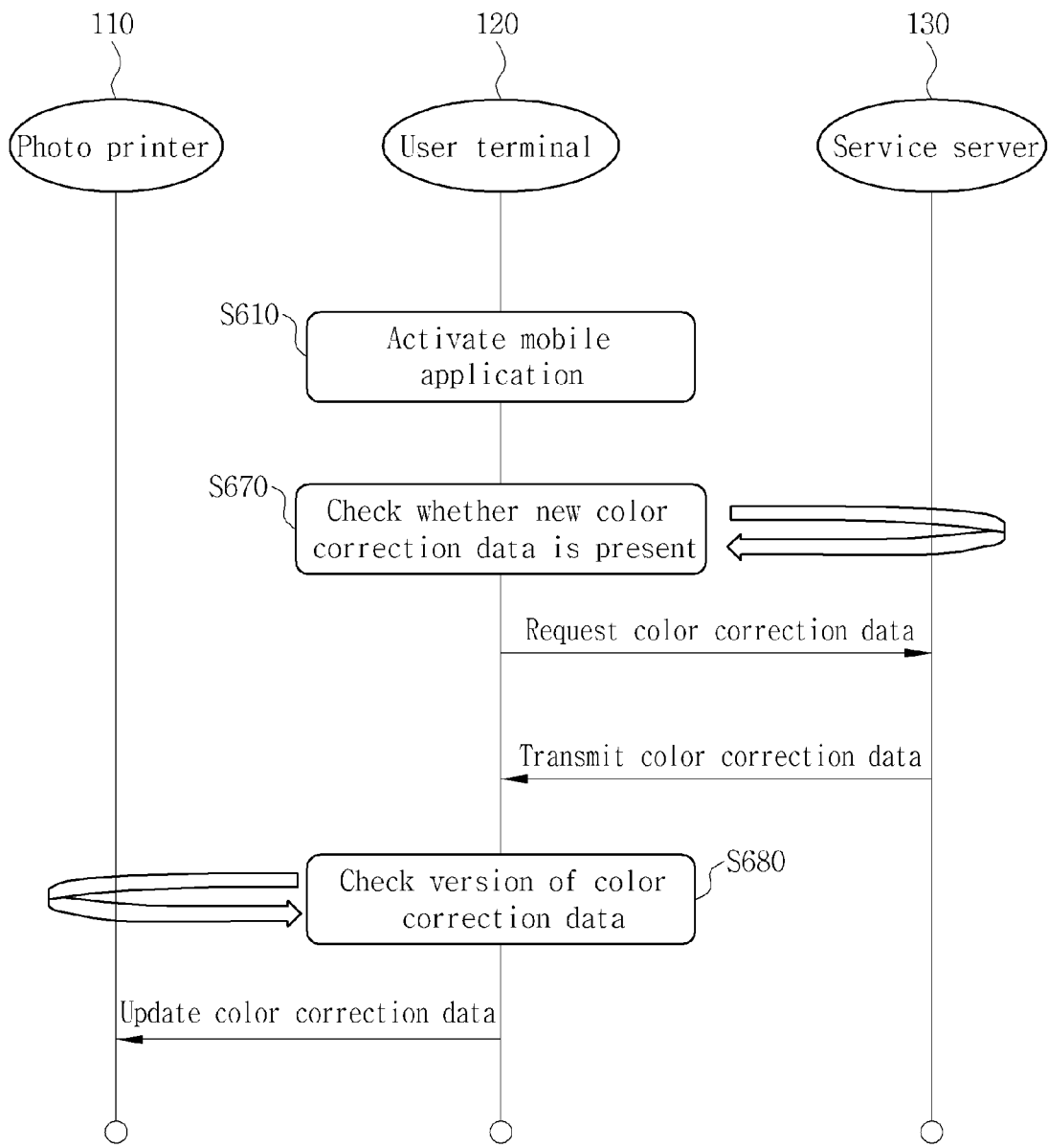
FIG. 4 is a diagram showing a method for correcting a color of a photo printer according to an embodiment of the present invention.

FIG. 4 is a diagram showing a method for correcting a color of the photo printer according to an embodiment of the present invention.

As shown in FIG. 4, the user terminal 120 may activate a mobile application, and may check whether a new version of extension color correction data previously registered with the service server is present using the activated mobile application.

Next, if, as a result of the check, the new version of extension color correction data is found to have been registered, the user terminal 120 may download the new version of extension color correction data.

Next, the user terminal 120 may check a version of first color correction data previously stored in the photo printer 110 while operating in conjunction with the photo printer 110 using short-distance wireless communications.

Next, if, as a result of the check, the version of the first color correction data previously stored in the photo printer 110 is found to be not the latest version, the user terminal 120 may send the downloaded extension color correction data to the photo printer so that the first color correction data stored in the photo printer is updated.

For example, if, as a result of the check, the version of the first color correction data previously stored in the photo printer 110 is found to be earlier than the version of the extension color correction data downloaded from the service server 130, the user terminal 120 updates the first color correction data stored in the photo printer with the downloaded extension color correction data because the version of the first color correction data is not the latest version.

Figure 5:
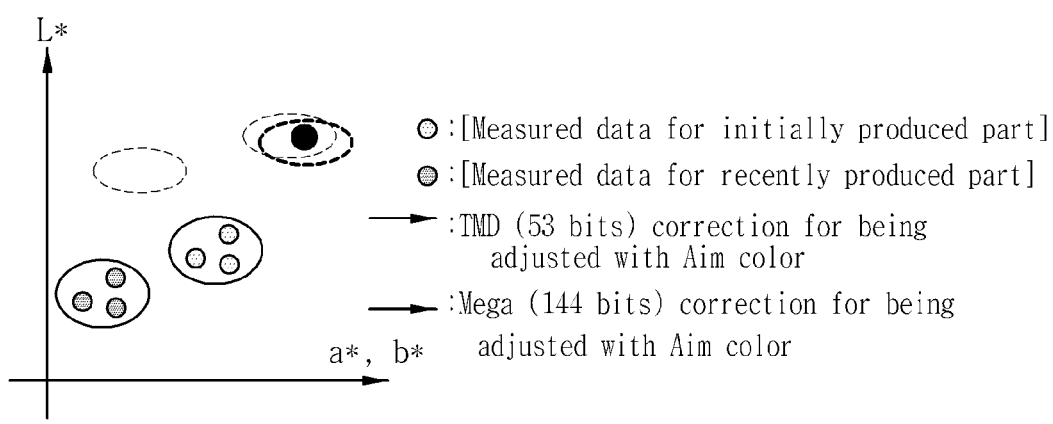
FIG. 5 is a diagram showing the results of the measurement of color correction according to an embodiment of the present invention.

FIG. 5 is a diagram showing the results of the measurement of color correction according to an embodiment of the present invention.

From FIG. 5, it may be seen that it is more effective to represent a target color using extension color correction data of 144 bits rather than to represent a target color using first or second color correction data of existing 53 bits.

The reason for this is that as in Equation 1, the system according to the present invention has increased the range in which a color can be corrected because the parameters Sx1 and Sx2 in addition to the values $G_{inv}$ and $S_{eff}$ have been added.

Meanwhile, the aforementioned embodiments of the present invention may be written in the form of a program executable in a computer, and may be implemented in a general-purpose digital computer driven using a computer-readable recording medium. The computer-readable recording medium includes storage media, such as magnetic storage media (e.g., ROM, a floppy disk and a hard disk) and optical reading media (e.g., CD ROM and DVD).

The aforementioned embodiments are illustrative, and those skilled in the art may change and modify the present invention in various ways without departing from the essential characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the following appended claims. Accordingly, the present invention should be construed as covering all modifications or variations derived from the meaning and scope of the appended claims and their equivalents.

INDUSTRIAL APPLICABILITY

The present invention is very useful in industrial applications because new extension color correction data registered with a service server can be downloaded if the new extension color correction data is present, a version of color correction data stored in a photo printer can be checked, and the color correction data stored in the photo printer can be updated with the downloaded extension color correction data as a result of the check.

The invention claimed is:

1. A color correction system for a photo printer, comprising:
a color photo printer having a smart sheet mounted thereon and an internal memory, wherein the smart sheet includes a color correction data for a color print paper; the internal memory stores the color correction data from the smart sheet and the color correction data comprises a required energy for printing a required color at a head temperature of the color photo printer and a sensitivity of media for the head temperature;
a user terminal connected to the color photo printer through a short-distance communication module, the user terminal including a control unit storing a mobile application; and
a service server connected to the user terminal through a communication network, the service server having a data base, wherein the data base stores an extension color correction data for a new color print paper; the extension color correction data is data for further correcting a color using the color correction data stored in the internal memory of the color photo printer,
wherein the control unit is configured to activate the mobile application; check with the service server through the communication network whether the extension color correction data is present if present, request the extension color correction data to the service server; and receive the extension color correction data from the service server,
the service server is configured to transmitting the extension color correction data to the user terminal when requested therefrom,
the control unit is further configured to compare the extension color correction data with the color correction data stored in the internal memory of the color photo printer; and update the color correction data with the extension color correction data when required based on the comparison, and
the color photo printer is configured to update the color correction data with the extension color correction data under control of the control unit.

* * * * *